United States Patent [19]

Schwertfeger

[11] Patent Number: 6,156,386
[45] Date of Patent: Dec. 5, 2000

[54] METHOD FOR THE PREPARATION OF ORGANICALLY MODIFIED AEROGELS

[75] Inventor: Fritz Schwertfeger, Mühldorf, Germany

[73] Assignee: Cabot Corporation, Boston, Mass.

[21] Appl. No.: 09/202,627

[22] PCT Filed: Jun. 6, 1997

[86] PCT No.: PCT/EP97/02932

§ 371 Date: Aug. 30, 1999

§ 102(e) Date: Aug. 30, 1999

[87] PCT Pub. No.: WO97/48642

PCT Pub. Date: Dec. 24, 1997

[30] Foreign Application Priority Data

Jun. 17, 1996 [DE] Germany .......................... 196 24 066

[51] Int. Cl.[7] ...................................................... B05D 3/02
[52] U.S. Cl. .......................... 427/352; 427/379; 427/387
[58] Field of Search .................................. 427/352, 379, 427/387

[56] References Cited

U.S. PATENT DOCUMENTS 4,667,417   5/1987   Graser et al. .................................. 34/9
5,122,291   6/1992   Wolff et al. ................................. 252/62
5,275,796   1/1994   Tillotson et al. ........................ 423/338
5,565,142  10/1996   Deshpande et al. ................. 252/315.2
5,738,801   4/1998   Ziegler et al. ............................. 252/62
5,795,556   8/1998   Jansen et al. ........................... 423/338

FOREIGN PATENT DOCUMENTS 19541279    5/1997   Germany .
WO 96/22942 8/1996   WIPO .
WO 97/03017 1/1997   WIPO .

*Primary Examiner*—Erma Cameron
*Attorney, Agent, or Firm*—Marshall, O'Toole, Gerstein, Murray & Borun

[57] ABSTRACT

The invention relates to a process for producing aerogels with permanently hydrophobic surface groups, in which a) silicate lyogel is provided, b) the gel provided in step a) is washed with an organic solvent, c) the gel obtained in step b) is surface silylated and d) the surface-silylated gel obtained in step c) is dried, where the organic solvent used in step b) is a diether of formula (I) $R^1$—O—$(CH_2)_n$—O—$R^2$ in which $R^1$ and $R^2$ are mutually independently the same or different alkyl groups with 1 to 4 C atoms and n is a natural number in the range from 1 to 5.

12 Claims, No Drawings

METHOD FOR THE PREPARATION OF ORGANICALLY MODIFIED AEROGELS

This is the national phase of International Application No. PCT/EP97/02932, filed Jun. 6, 1997.

The invention is concerned with a method for the preparation of organically modified $SiO_2$ aerogels.

Aerogels, especially those with porosities greater than 60% and densities below 0.6 g/cm$^3$, have an extremely low thermal conductivity and therefore are used as thermal insulation material, for example, as described in EP-A-0 171 722.

In the broadest sense, that is, in the sense of "gel with air as dispersing agent", aerogels are produced by drying of a suitable gel. In this sense, the term "aerogel" includes aerogels in the narrow sense, xerogels and cryogels. A dry gel is called aerogel in the narrowest sense when the liquid of the gel is removed above the critical temperature and starting at pressures above the critical pressure. On the other hand, if the liquid of the gel is below the critical state and is removed, for example, with the formation of a liquid-vapor boundary phase, then the gel is frequently called a xerogel. It should be pointed out that the gels according to the invention are aerogels in the sense of a gel with air as dispersing agent.

$SiO_2$ aerogels can be prepared, for example, by acid hydrolysis of tetraethylorthosilicate in ethanol. During the hydrolysis, a gel is formed, the structure of which is determined among others by the temperature, the pH value and the duration of the gelling process. However, generally, the gel structure collapses during the drying of wet gels, since the capillary forces that occur during drying are extremely large. Gel collapse can be prevented by carrying out the drying above the critical temperature and critical pressure of the solvent. Since, in this region, the liquid-gas phase boundary disappears, capillary forces are also absent and the gel does not change during drying, that is, no shrinking of the gel occurs during drying. Manufacturing methods based on this drying technique are known, for example, from EP-A-0 396 076 or WO 92/03378. However, this technique requires, for example when using ethanol, a temperature of about 240° C. and pressure above 60 bar. By replacing the ethanol by $CO_2$ before drying, the drying temperature can be reduced to about 30° C. but then the pressure required is above 70 bar.

An alternative to the above drying is a method for the below-critical drying of $SiO_2$ gels, in which these are reacted with a chlorine-containing silylating agent before drying. The $SiO_2$ gel can be obtained, for example, in this method by acid hydrolysis of tetraalkoxysilanes, preferably tetraethoxysilane (TEOS) in a suitable organic solvent, preferably ethanol, using water. After the exchange of the solvent for a suitable organic solvent, in a next step, the obtained gel is reacted with a chlorine-containing silylating agent. Due to their reactivity, methylchlorosilanes ($Me_{4-n}SiCl_n$ with n=1 to 3) are used as silylating agent. The $SiO_2$ gel thus obtained, the surface of which is modified with methylsilyl groups, is then dried from an organic solvent in air. Thus, aerogels with densities of 0.4 g/cm$^3$ and porosities above 60% can be obtained.

The preparation method based on this drying technology is described in detail in WO 94/25149.

The gels described above can also be reacted with tetraalkoxysilanes in the alcoholic-aqueous solution before drying and aged in order to increase the strength of the gel network, as disclosed, for example, in WO 92/20623.

In the method described above, the tetraalkoxysilanes, which are used as starting materials, represent an extraordinarily high cost factor.

A significant reduction in cost can be achieved by using water glass as starting material for the production of $SiO_2$ gels. For this purpose, for example, starting with an aqueous water glass solution, with the aid of an ion-exchange resin, a silicic acid can be prepared which polycondenses upon the addition of a base to an $SiO_2$ gel. After exchange of the aqueous medium for a suitable organic solvent, in the next step, the obtained gel is reacted with a chlorine-containing silylating agent. Due to their reactivity, again, methylchlorosilanes ($Me_{4-n}SiCl_n$ with n=1 to 3) are used as silylating agent. The $SiO_2$ gel obtained in this way, the surface of which is modified with methylsilyl groups, can then be dried in air from an organic solvent. The method of preparation based on this technique is disclosed, for example, in DE-A-43 42 548.

During silylation with chlorine-containing silylating agents, necessarily hydrogen chloride (HCl) occurs in very large amounts, as well as a number of related by-products, which require optionally a very extensive and cost-intensive purification of the silylated $SiO_2$ gels by washing them several times with a suitable organic solvent.

In DE-C 19502453, the use of a chlorine-free silylating agent is described. For this purpose, a silicate lyogel is prepared, for example, according to one of the methods mentioned above, and is reacted with a chlorine-free silylating agent. In this case, preferably methylisopropenoxysilane ($Me_{4-n}Si(OC(CH_3)CH_2)_n$ with n=1 to 3) is used as silylating agent. The $SiO_2$ gel thus obtained, which is modified with methylsilyl groups on its surface, can then again be dried in air from an organic solvent.

The use of the chlorine-free silylating agent solves the problem of the formation of HCl, but the chlorine-free silylating agents used represent a very high cost factor.

In WO 95-06617 and in German Patent Application 195 41 279.6, methods are disclosed for the preparation of silicic acid aerogels with hydrophobic surface groups.

In WO 95/06617, the silicic acid aerogels are obtained by reacting a water glass solution with an acid at a pH value of 7.5 to 11, largely removing the ionic components from the formed silicic acid hydrogel by washing with water or dilute aqueous solutions of inorganic bases, whereupon the pH value of the hydrogel is kept in the range from 7.5 to 11, replacement of the aqueous phase contained in the hydrogel by an alcohol and subsequent supercritical drying of the obtained alcogel.

Similarly to WO 95/06617, German Patent Application 195 41 279.6 describes the preparation of silicic acid aerogels followed by below-critical drying.

However, in both methods, the omission of the chlorine-containing silylating agent leads to an aerogel which only has hydrophobic surface groups bound to oxygen. These can easily be cleaved again in a water-containing atmosphere. As a result of this, the described aerogels are hydrophobic only for a short time. Therefore, in order to obtain permanently hydrophobic aerogels, one cannot omit the use of the silylating agents described above.

Therefore, the task of the present invention was to provide a method for the preparation of permanently hydrophobic aerogels, in which the usual silylating agents can be used, but, in spite of this, significantly less by-products are formed than in the method known from the state of the art.

Another task of the present invention was to reduce the expense that arises from the distillative separation of the solvent/$H_2O$ mixtures.

These tasks are solved by a method for the preparation of aerogels with permanently hydrophobic surface groups, in which a) a silicate lyogel is prepared,
b) gel of step a) is washed with an organic solvent,
c) the gel obtained in b) is silylated on the surface and
d) the surface-silylated gel obtained in step c) is dried, characterized by the fact that, in step b) a diether having formula I is used as organic solvent, $$R^1-O-(CH_2)_n-O-R^2 \qquad (I)$$

where $R^1$ and $R^2$, independently of one another, can be the same or different, and are alkyl groups with 1 to 4 C atoms and n is a natural number in the range from 1 to 5.

The diethers used according to the invention have the advantage in comparison to the solvents known from the state of the art that, in the presence of the silylating agent used in c), they do not show any reaction and that they can be separated from $H_2O$ with the aid of solid NaOH during recycling.

In a preferred embodiment, in step a), a silicate lyogel is used, which can be obtained by hydrolysis and condensation of Si alkoxides in an organic solvent with water. A tetraalkoxysilane, preferably tetraethoxy- or tetramethoxysilane is used as Si alkoxide. The organic solvent is preferably an alcohol, especially preferably ethanol and methanol, to which up to 20 volume % of water can be added.

During the hydrolysis and condensation of the Si alkoxides in an organic solvent with water, acids and/or bases can be added in a one- or two-part step as catalyst.

In an especially preferred embodiment, in step a), a silicate lyogel is used which is prepared by bringing a water glass solution to a pH value of $\leq 3$, with the aid of an acidic ion-exchange resin, a mineral acid or a hydrochloric acid solution, and then the silicic acid, which is thus obtained, is polycondensed to an $SiO_2$ gel by the addition of a base, and, in case a mineral acid was used, the gel is washed with water until it is essentially free from electrolytes. In general, sodium and/or potassium water glass is used. The ion-exchange resin is preferably an acidic resin, especially those being suitable which contain sulfonic acid groups. In case mineral acids are used, above all, hydrochloric acid and sulfuric acid are suitable. If one uses hydrochloric acid solution, above all, aluminum salts are suitable, especially aluminum sulfate and/or chloride. As base, generally, $NH_4OH$, NaOH, KOH, $Al(OH)_3$ and/or colloidal silicic acid is used. In case a mineral acid is used, the $SiO_2$ gel produced with the aid of a base is washed with water until it is essentially free from electrolytes. Preferably, the washing is continued until the discharged washing water has the same electrical conductivity as demineralized water. Before washing, the gel can preferably be aged, namely, generally at 20 to 100° C., preferably at 40 to 100° C. and especially at 80 to 100° C. and can be adjusted to a pH value of 4 to 11, preferably 5 to 9, and especially 5 to 8. The time for this is generally 1 second to 48 hours, preferably from 1 second to 24 hours and especially from 1 second to 5 hours.

The lyogel prepared in step a) preferably from the silicate starting compounds described above may also contain zirconium, aluminum and/or titanium compounds which are able to condense.

Step a) is generally carried out at a temperature between the freezing point of the solution and 70° C. Optionally, at the same time, a molding step can be introduced, for example, spray-forming, extrusion or droplet formation.

Before washing with a diether having formula I in step b), the silicate lyogel used in step a) can be washed with a solvent other than the diether used according to the invention.

In this case, generally aliphatic alcohols, ethers, esters or ketones, as well as aliphatic or aromatic hydrocarbons are used as organic solvent. One can also use mixtures of the above solvents. Preferred solvents are ethers. Washing or solvent exchange is not defied here as just exchanging the solvent once, but optionally repeating this several times with different solvents.

The gel obtained in step a) is washed in step b), preferably with a diether having formula I until the water content of the gel is $\leq 5$ weight %, especially preferably $\leq 2$ weight % and especially $\leq 1$ weight %. Preferred are diethers having formula I in which $R^1$ and $R^2$, independently of one another, are the same or different methyl or ethyl groups and n is a natural number in the range from 2 to 4, for example, dimethoxyethane or diethoxyethane. Dimethoxyethane (DME) ($R^1=R^2=CH_3$ and n=2) is especially preferred as the diether having formula I.

When using the especially preferred solvent, DME, a $DME/H_2O$ mixture is obtained, which can be separated simply with solid NaOH. For this purpose, a sufficient amount of solid NaOH is dissolved in the $DME/H_2O$ mixture until the $H_2O$ is completely present in the form of an NaOH solution as phase 2. The addition of solid NaOH can be carried out according to any of the methods known to the expert in the field, for example, stirring. Semicontinuous or continuous methods are preferred.

The separation of the DME/NaOH (liquid) phases can also be carried out according to any of the methods known to the expert in the field, for example, with a phase separator. Here, again, semicontinuous or continuous methods are preferred.

The lyogel obtained in step b) can be subjected to another aging process. This is generally done between 20° C. and a boiling point of the organic solvent. Optionally, the aging can also be carried out under pressure at higher temperatures. The time is generally 0.5 to 48 hours, preferably 0.5 to 24 hours. After such aging, optionally, another solvent exchange can follow with the same or a different solvent. This additional aging step can be optionally repeated again.

In step c), the solvent-containing gel is reacted with a silylating agent. In general, silanes having the formula $R^1_{4-n}SiCl_n$ or $R^1_{4-n}Si(OR^2)_n$ with n=1 to 3, are used as silylating agent, where $R^1$ and $R^2$, independently of one another, can be the same or different and are $C_1-C_6$ alkyl, cyclohexyl or phenyl. Isopropenoxysilanes as well as silazanes are also suitable. Preferably, one uses trimethylchlorosilane. Moreover, any silylating agent known to the expert in the field can be used, for example, even those which are disclosed in DE-A-44 30 669. The reaction is generally carried out at 20–100° C., preferably at 20–70° C., when necessary, in a solvent. Optionally, the silylation can be accelerated with a catalyst, for example, an acid or base.

Before step d), the silylated gel is preferably washed a protic or aprotic solvent until the unreacted silylating agent is essentially removed (residual content $\leq 0.2$ weight %). Suitable solvents are generally aliphatic alcohols, ethers, esters or ketones, as well as aliphatic or aromatic hydrocarbons. Preferred solvents are those used in step b).

In step d), the silylated and preferably subsequently washed gel is dried, preferably below the critical conditions, especially preferably at temperatures of −30 to 200° C. and especially from 0 to 100° C. The pressures used during drying are preferably at 0.001 to 20 bar, especially preferably at 0.01 to 5 bar.

The gel obtained in step c) can also be dried under supercritical conditions. This requires corresponding to the particular solvent, higher temperatures than 200° C. and/or pressures higher than 20 bar. This is possible, but it is related to an increased expenditure and does not bring about any essential advantages.

The drying is generally continued until the gel has a residual solvent content of less than 0.1 weight %.

In another embodiment, the gel can be subjected to surface modification or network strengthening, depending on the application. This is done by reacting the obtained gel with a solution of an alkyl and/or arylorthosilicate which is capable of condensation, having the formula $R^1_{4-n}Si(OR^2)_n$, where n=2 to 4 and $R^1$ and $R^2$, independently of one another, are the same or different linear or branched $C_1$–$C_6$ alkyl groups, cyclohexyl groups or phenyl groups, or with an aqueous silicic acid solution. This network strengthening can be carried before and/or after each performed aging step or solvent exchange.

In another embodiment, after the forming polycondensation in step a) and/or after any subsequent process step, the gel can be reduced in size by any of the methods known to the expert in the art, for example, grinding.

Furthermore, before the preparation of the gel, a turbidity agent can be added to the sol as an additive, especially an IR turbidity agent to reduce the contribution of radiation to the thermal conductivity, for example, soot, titanium oxide, iron oxide and/or zirconium dioxide.

Also before the gel preparation, in order to increase the mechanical stability, fibers can be added to the sol. Inorganic fibers, such as glass fibers or mineral fibers, organic fibers, such as polyester fibers, aramid fibers, nylon fibers, or fibers of vegetable origin as well as mixtures of these can be used as fiber material. The fibers can also be cooled, for example, they can be polyester fibers, which are metallized with a metal such as aluminum.

The method according to the invention is explained below in more detail with the aid of practical examples without this representing a limitation.

EXAMPLE 1

1 L of a sodium water glass solution with a content of 7 weight % $SiO_2$ and an $Na_2O:SiO_2$ ratio of 1:3.3) is stirred together with 0.5 L of an acidic ion-exchange resin (styrene vinylbenzene copolymer with sulfonic acid groups, commercially available under the name Duolite C20®) until the pH value of the aqueous solution becomes 2.4. Then the ion-exchange resin is filtered off and the aqueous solution is adjusted to a pH value of 4.7 with 1 molar NaOH solution. Then the obtained gel is aged for 3 hours at 85° C. and the water is extracted with 3 L of dimethoxyethane (DME). Then the DME-containing gel is silylated with trimethylchlorosilane at room temperature for 5 hours (5 weight % of trimethylchlorosilane per gram of wet gel). After washing the gel with 3 L DME, drying of the gel is performed in air (3 hours at 40° C., then 2 hours at 50° C. and 12 hours at 150° C.). The transparent aerogel thus obtained has a density of 0.13 g/cm³. The specific surface according to BET is 500 m²/g. The λ value is 0.015 W/mK.

The thermal conductivity was determined with a hot wire method (see, for example, O. Nielsson, G. Rüschenpöhler, J. Gross, J. Fricke, High Temperatures-High Pressures, Volume 21, 267–274 (1989)).

EXAMPLE 2

The preparation of the aerogel is done as in Example 1. The DME/$H_2O$ mixture (4 L, 25 volume % $H_2O$/75 volume % DME) is treated with 1 kg of solid NaOH under stirring. The aqueous phase thus formed is separated in a separatory funnel from the DME phase. The aqueous phase represents a 50% NaOH solution while the DME phase still contains 0.3 weight % of $H_2O$.

What is claimed is:

1. Method for the preparation of aerogels with permanently hydrophobic surface groups, comprising the steps of:

a) providing a silicate lyogel, b) washing the gel of a) with an organic solvent, c) surface-silylating the gel of b), and d) drying the surface-silylated gel of c), wherein the organic solvent of step b) is a diether having the formula

$$R^1\text{—}O\text{—}(CH_2)_n\text{—}O\text{—}R^2$$

where $R^1$ and $R^2$, independently of one another, are the same or different alkyl groups with 1 to 4 C atoms and n is a natural number in the range from 1 to 5.

2. Method of claim 1, wherein the silicate lyogel is obtained by hydrolyzing and condensing Si alkoxides in an organic solvent with water.

3. Method of claim 1 comprising the step of preparing the silicate lyogel by bringing an aqueous water glass solution to a pH value of ≦3 with the aid of an acidic ion-exchange resin, a mineral acid, or a hydrochloric acid solution, to obtain a silicic acid, polycondensing the silicic acid thus obtained to an $SiO_2$ gel by adding a base and, wherein a mineral acid is used, washing the gel with water until it is essentially free of electrolytes.

4. Method of claim 3 comprising the step of allowing the $SiO_2$ gel of step a) to age at 20° C. to 100° C. and at a pH value of 4 to 11 for a duration of 1 second to 48 hours before the gel is washed.

5. Method of claim 1 wherein in the diether $R^1$ and $R^2$, independently of one another, are the same or different methyl or ethyl groups and n is a natural number in the range of 2 to 4.

6. Method of claim 5 wherein dimethoxyethane is the organic solvent.

7. Method of claim 1 comprising the step of washing the gel in step b) until the water content of the gel is ≦5 weight %.

8. Method of claim 1 comprising the step of reacting the gel in step c) with a silane having the formula $R^3_{4-n}SiCl_n$ or $R^3_{4-n}Si(OR^4)n$ with n=1 to 3, where $R^3$ and $R^4$, independently of one another are the same of different $C^1$–$C^6$ alkyl, cyclohexyl, or phenyl groups.

9. Method of claim 1 comprising the step of washing the surface-silylated gel with a protic or aprotic solvent before step d).

10. Method of claim 1 comprising the step of drying the surface-silylated gel under below critical conditions.

11. Method of claim 1 comprising the step of reacting the gel obtained in step b), before silylation, with a solution of alkyl and/or arylorthosilicates capable of condensation and having the formula $R^5_{4-n}Si(OR^6)_n$ where n=2 to 4 and $R^5$ and $R^6$, independently of one another, are linear or branched $C_1$–$C_6$ alkyl groups, cyclohexyl groups or phenyl groups, or with an aqueous silicic acid solution.

12. Method of claim 1 comprising the step of incorporating additives and/or fibers are into the gel during preparation thereof.

* * * * *